United States Patent [19]
Shellhause

[11] Patent Number: 5,348,040
[45] Date of Patent: Sep. 20, 1994

[54] FLUIDIC VALVE MECHANISM

[75] Inventor: Ronald L. Shellhause, Vandalia, Ohio

[73] Assignee: RMS Engineering, Inc., Vandalia, Ohio

[21] Appl. No.: 975,643

[22] Filed: Nov. 2, 1992

[51] Int. Cl.$^5$ .............................................. B60T 11/22
[52] U.S. Cl. ........................................ 137/118; 60/585
[58] Field of Search .................... 137/102, 118; 60/585

[56] References Cited
U.S. PATENT DOCUMENTS

3,913,327 10/1975 Shellhause ............................ 60/585
5,003,780 4/1991 Shellhause ............................ 60/585

Primary Examiner—Robert G. Nilson
Attorney, Agent, or Firm—D. D. McGraw

[57] ABSTRACT

A fluid flow sensitive valve mechanism, including a valve member and a valve positioning device, positioned in a valve chamber between first and second inlet-outlet ports controls opening and closing of a third inlet-outlet port in response to flow of fluid to and from the valve chamber through two or more of the ports. The valve member has a planar platform section and a valve body section extending from one side of the planar platform section. The first inlet-outlet port connects with the valve chamber through a surface engageable by one end of a valve member planar platform section. Fluid flow impingement acts on various valve mechanism surfaces so that when fluid flows from the first port into the valve chamber the valve mechanism is moved to close the third port. It keeps the third port closed so long as there is thereafter no fluid flowing from the second or third port into the valve chamber. When fluid flows through the first port from the valve chamber the valve mechanism is moved to open the third port. The valve positioning device has fluid flow impingement surfaces moving it and the valve member, closing the third port, and moving them to open the third port while acting to lock the valve member against closing that port while fluid is still flowing into the valve chamber from the second port.

23 Claims, 4 Drawing Sheets

FLUIDIC VALVE MECHANISM

BACKGROUND OF THE INVENTION

The valve mechanisms of U.S. Pat. Nos. 3,913,327 and 5,003,780, respectively entitled "Flow Sensitive Valve Mechanism" and "Fluidic Valve Mechanism" and respectively issued Oct. 21, 1975 and Dec. 28, 1989 in the name of the inventor of the invention herein disclosed and claimed provide the background for this invention.

The first noted patent disclosure provided a fluid flow sensitive valve member in a valve chamber between a pressurizing chamber and an outlet port of a master cylinder. A compensation port leading to a fluid reservoir also opened into the valve chamber. The valve member had flow sensitive fins angularly positioned in the flow path of fluid flowing through the valve chamber. The valve member had a valve body with a guide pin extending upwardly from the body into the lower portion of the compensation port to maintain the valve member in lateral position relative to the valve seat formed at the bottom of the compensation port. That seat could be engaged by the valve body to close off the compensation port when the valve was moved upwardly, and could be disengaged to open the compensation port when the valve was moved downwardly. A first valve member flow sensitive fin, formed on the valve body, was positioned near the port to the pressurizing chamber and was angled so as to deflect the fluid downwardly when fluid pressurization in the pressurizing chamber occurred. The impact force of the fluid acting on the fin moved the valve member upwardly to close the compensation port. The fluid flowed under and around the valve member, passing into the outlet port and pressurizing the appropriate mechanism to be operated by the fluid pressure.

A second valve member flow sensitive fin, also formed on the valve body and parallel to the first fin, was positioned near the outlet port so that when the pressure was released, the fluid flowing back into the valve chamber from the outlet port impinged on the second fin, forcing the valve member downwardly and opening the compensation port. The returning fluid coming back through the outlet port flowed through the compensation port into the fluid reservoir and also past the valve member back into the pressurizing chamber. The valve member was made of a material having a specific gravity slightly greater than the specific gravity of the fluid used so that the assembly would be self-bleeding.

In the second noted patent disclosure, the valve mechanism has features that provide positive functional actions that cannot be deviated and are necessary because of the extremely sensitive flow conditions in the mechanism. The disclosure shows structure which controls the valve member during all fluid flow conditions, and particularly during post-release fluid flow situations, to force the valve member to the proper position for each function.

These functions include (1) sealing the reservoir port at the minimum flow conditions occurring with very slow apply rates; (2) causing all return flow coming back toward the reservoir and the master cylinder upon release of the master cylinder to enter either the master cylinder bore or the reservoir; and (3) causing all post-release return flow to enter the reservoir. Furthermore, during certain of the final release instantaneous positions, or during post-release flow conditions, to allow reapply demand imposed on the system to take control of the valve so that a safe, substantially instantaneous reapply is obtained.

The structure of the second noted patent disclosure which accomplishes this includes a valve member providing an arrangement for sealing and opening the reservoir port, either as a subassembly of a valve mechanism or as a single component mechanism. The valve member, or the entire valve mechanism, is referred to as a fluidic valve, indicating that it is operated by and controls fluid flows and pressures by flow of the fluid itself. The disclosed valve mechanism is a multi-part assembly, and it includes the valve member and a positive valve member positioning device.

One such positive positioning device or interface structure is disclosed as a strut-like pivotable lever formed from sheet material, preferably a metal such as stainless steel, and having flow impingement areas which are acted upon by various fluid flows to move the lever so that it either prevents or permits the valve member to close the reservoir port. Another disclosed device is formed as an integral part of the valve member which cooperates with a receiving chamber and is acted upon by various fluid flows to obtain similar results.

Advantages obtainable by employment of the fluidic valve embodying the invention disclosed in the second noted patent, and also in the improvement invention herein disclosed and claimed, are numerous. They include:

(1) Reduction in length of a master cylinder. The secondary seal can be eliminated, giving as much as a forty percent reduction in master cylinder length. Further length reduction is attainable by substantially reducing the return spring loads because high return spring loads are not necessary.

(2) With shortened master cylinders, the technique of recessing the master cylinder axially within a typical vacuum power brake booster will result in having very little of the master cylinder protruding axially beyond the booster, taking up much less space in an automotive engine compartment than a booster-master cylinder combination in which most if not all of the master cylinder protrudes axially beyond the booster.

(3) Remote reservoirs can be used in various hydraulic actuating and release systems. For example, they may be used in a hydraulic brake system without the added cost penalty of additional fluid lines and fittings to connect the remote reservoir to the master cylinder. The fluidic valves can be used to feed brake fluid at any high point in the line in the pressure system between the master cylinder and the vehicle brake assemblies. This, in combination with the very short booster-master cylinder assembly, provides much more latitude in brake system routing and design without added complexity or cost penalty. The same advantages apply in a hydraulic push-pull cable system used for two-position or other multiple position control of a mechanism. Such mechanisms include air flow doors in heating and air conditioning systems for vehicles as well as buildings or sensitive equipment, and vehicle parking brake cable connections between a parking brake pedal and the parking brake itself.

(4) Silicone brake fluid can be more readily used with the fluidic valves because very little negative pressure is created on any release stroke, and makeup or compensation fluid to the system takes place with very little fluid aeration.

(5) Air removal is a natural with the fluidic valve. Any air bubbles in the hydraulic fluid system, commonly caused by fluid aeration, are quickly cleared into the reservoir, eliminating that undesirable cause of fluid compression which when the brake system is actuated contributes to brake loss.

(6) Master cylinder seal life is improved since the seals do not have to run over bypass holes in the master cylinder bore. This totally eliminates the cutting of the seal or cup lips by the bypass holes. Since cup lip seals are not needed, intermittent failure of the cup seals through hydroplaning is also eliminated. In prior master cylinder designs using lipped cup seals, the lips had to collapse to allow makeup fluid to pass into the system. On rare occasions, this feature allowed hydrostatic shock to support the cup lips away from the master cylinder bore. This resulted in what is known in the brake industry as a phantom failure. The problem would be evident when both pressure chambers were affected in this manner at the same time, giving a complete loss of braking action on a master cylinder actuating stroke, yet would appear to fully recover on the next actuating stroke with no structurally apparent reason for the intermittent failure when the master cylinder was examined.

Eliminating the bypass holes also eliminates the need for critical location of the bypass holes. This simplifies manufacture, since only bore surface finish and stroke length remain to be controlled. The outlet holes are considerably larger in diameter than bypass holes, and position tolerances for these holes are relatively liberal. With master cylinder bores 40% to 50% shorter because of elimination of the secondary seals and the bypass holes, only one seal being necessary per pressure chamber, machining is reduced. Shorter bore depths are more easily machined.

(7) A serious concern in failure mode studies of master cylinders is the presence of particles of foreign material in the brake fluid circuits. Such materials can cause seal and bypass orifice failures once it is in the pressure side of the brake system. Materials commonly found are small plastic flashing segments, small metallic particles, and small seal material which originated as flashing or because of the nipping of the seal cup lips.

To provide an absolute worst case test, particles of materials having about the same density as brake fluids, lighter than brake fluids, and also heavier than brake fluids, were packed into fluidic valves embodying the invention disclosed and claimed in the second noted patent. Consistently after several apply cycles all of the foreign material would be blown from the valve chambers into the reservoirs, leaving the valves purged for the next apply. While purging the valves of the foreign materials, only a slight pedal travel loss occurred, with two to five pedal strokes purging even the packed valve chamber. Obviously, such a packed valve chamber is an artificial contrivance, and is a much worse condition than that found at any time in actual practice.

With the fluidic valve made of polyamide, a material only slightly more dense than brake fluid, polyamide flash debris is a possibility. Such debris will float and move around in the brake fluid with very little fluid flow. Tests showed that even if a large piece of polyamide flash with small entry dimensions should occlude the valve seat area, the valve sealing performance is diminished in that one valve chamber because the compensation port acts as a restrictive orifice for only one apply, only for that valve chamber, and not both chambers. The next apply was consistently found to purge the valve as the debris entered the reservoir.

The flow energy in the fluidic valve is immense, even on the slowest of master cylinder apply operations. It is this intense flow energy that keeps the entire valve area clean and clear of debris. Tests with extremely slow pedal applications by a machine in a very uniform manner, on the order of as much as thirty seconds to one minute, which are well beyond the slowest of pedal applications by a human brake operator in a vehicle, still closed each fluidic valve in less that 0.010 inch pedal travel loss for a manually actuated dual chamber master cylinder. When applied in a typical manner by typical drivers, only 0.010 inch pedal travel loss is common with a dual chamber master cylinder using fluidic valves disclosed in the second noted patent.

Considering that this is travel loss at the pedal itself, and that there is commonly about a 4:1 to 7:1 pedal ratio in vehicle service brake pedal arrangements, the fluidic valve for the primary pressurizing chamber is closed with a minuscule amount of master cylinder primary pressurizing piston movement. Assuming a 5:1 pedal ratio, the typical 0.010 inch pedal travel required to close the valve translates into 0.004 inch movement of the primary pressurizing piston in the pressurizing direction to close the valves for both the primary and secondary pressurizing pistons. With typical bypass holes and lipped cup seals, the primary piston movement required to move the primary cup seal lip to cover the primary bypass hole is about 0.10 inch. With the same 5:1 pedal travel ratio this translates to pedal travel loss of about 0.5 inch when a manually operated (no brake booster) system is employed. It is apparent that the use of the fluidic valve reduces the pedal travel loss by about 0.49 inch. This is a 50:1 improvement. When expressed in percentage improvement, this is a 5,000% improvement. A typical dual master cylinder with fluidic valves instead of cup seal lips, bypass ports and compensation ports has been found to provide as much savings in pedal travel loss as a quick take-up master cylinder, but without the complexity and losses of the old stepped bore quick take-up design.

When the typical current production dual master cylinder with cup seal lips, bypass ports and compensation ports is actuated by the typical production vacuum-suspended power brake booster, about the first one-eighth (0.125) inch of foot pedal travel acts only to open the booster air valve to begin to permit air at atmospheric air pressure to enter the variable pressure power chamber or chambers of the booster so as to begin to create a booster pressure differential across the booster power piston or pistons which in turn generate a booster output force delivered to the master cylinder. This assumes that there are no pedal linkage travel losses due to loose connections or pivot joints. The booster output force builds up as the booster power pressure differential increases and acts through a push rod to begin movement of the primary pressurizing piston of the master cylinder. This movement also moves the primary cup seal lip axially until it passes over the bypass port, closing that port. Only at this point of actuation is the master cylinder then ready to begin pressurizing brake fluid in its primary pressurizing chamber. Pressure in that chamber, as it builds up, then acts on the secondary master cylinder pressurizing piston, beginning the movement of that piston and the secondary cup seal lip on its forward end and culminating in the closure of the secondary pressurizing chamber bypass port. At this point both master cylinders have their bypass ports to the reservoir closed so that further movement of the booster output push rod will cause brake fluid to be pressurized in both master cylinder pressurizing chambers and that pressurized fluid delivered to the brake circuits connected to those pressurizing chambers to begin brake actuation. Further brake pedal movement in the actuating direction required to close both of these bypass ports from the rest or brake released position requires about one-half to five-eighths inch (0.5 inch to 0.625 inch) pedal travel. Thus the typical total foot brake pedal movement required just to begin to generate pressurized brake fluid in the master cylinder pressurizing chambers is about five-eighths (0.625) inch to three-fourths (0.75) inch, assuming no travel loss in the mechanical connections of the pedal assembly. In one regular production vehicle installation where this has been carefully measured, the total required brake pedal travel has been about three-fourths (0.75) inch.

In the same installation, but with the typical dual master cylinder and its reservoir now having fluidic valves embodying the invention herein disclosed and claimed to control the compensation ports instead of using axial movements of the cup seal lips to close the compensation ports, the same one-eighth (0.125) inch of pedal travel is still required to actuate the power brake booster so that it begins to move its output push rod in the actuating direction. At this point, it takes only sufficient additional brake foot pedal travel to obtain about two thousandths (0.002) inch master cylinder piston travel required to close each valve, or four thousandths (0.004) inch travel to close two valves for the dual master cylinder. With a 5:1 brake pedal ratio, this translates into the required approximately one one-hundredth (0.010) inch additional pedal travel in the pressurizing direction to close the valves for both the primary pressurizing circuit and the secondary pressurizing circuit. This means that, even with the booster-required pedal travel of one-eighth (0.125) inch, the total brake pedal travel to begin pressurizing brake fluid in both master cylinder pressurizing chambers is one hundred thirty-five thousandths (0.135) inch for typical brake applications.

Comparing this with the current production brake foot pedal travels of about three-fourths (0.75) inch with a vacuum-suspended power brake booster and a current production dual master cylinder, the improvement is about 555% when using the fluidic valves of the invention.

FIELD OF THE INVENTION

The invention relates to flow sensitive valves of the general type shown in the above-noted U.S. Patents, and more particularly to compensation port-controlling valve mechanisms adapted for use in or with master cylinder assemblies, hydraulic control systems and remote or integral fluid reservoirs as disclosed in detail in the second noted patent. The valve mechanism is sensitive to the flow of fluid from pressurizing chambers to brakes, clutches and other hydraulic pressure actuated devices. It is also sensitive to return flow in such device systems.

SUMMARY OF THE INVENTION

The improved fluidic valves of the valve mechanisms herein disclosed and claimed are easier to install than is the fluidic valve of either of the first and second above-noted patents. It is easier to mold, weighs less and accommodates a lighter weight strut or positioning device. It reacts slightly more quickly to fluid flow than the earlier valve of the second above-noted patent, and considerably more quickly than the valve of the first above-noted patent. When required to be removed, it is also easier to remove without damage to the valve itself.

The fluidic valve herein disclosed and claimed has no legs extending downwardly from the lower side of the valve planar section, decreasing its overall maximum diametrical distance required to be considered when installing or removing it. This permits the valve to be used in a smaller diameter valve chamber, with the commensurate benefits of a smaller valve chamber body, creating further savings in weight and space occupied and decreasing the amount of movements required during brake operations, further decreasing the time required from beginning brake pedal actuating movement until brake actuating pressure is being delivered to the brake circuits.

BRIEF DESCRIPTION OF THE DRAWINGS

FIGS. 13, 14 and 15 are respectively taken in the direction of arrows 13—13, 14—14 and 15—15 of FIG. 12.

DESCRIPTION OF THE PREFERRED EMBODIMENTS

Figure 1:
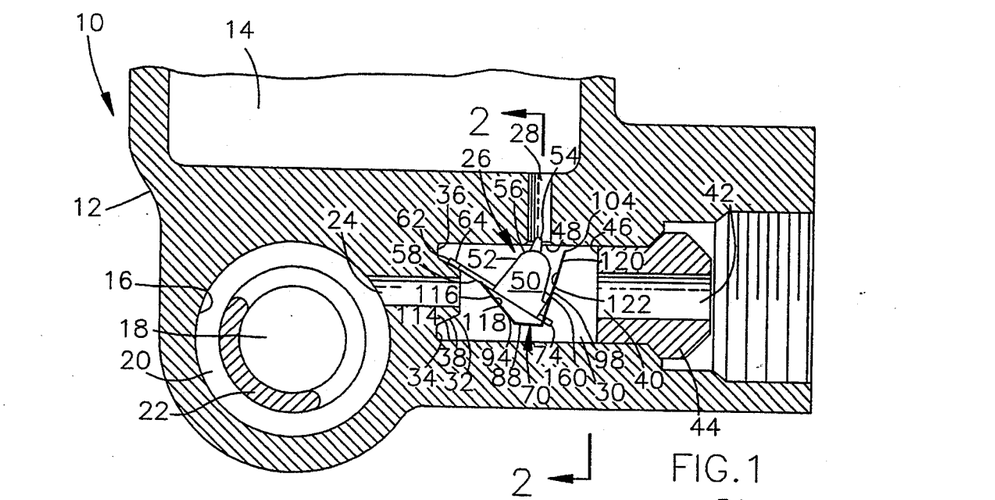
FIG. 1 is a cross-section view, with parts broken away and in cross-section, showing a master cylinder assembly containing the invention, the inventive structure being located in the plane of the cross-section view. The valve mechanism and valve assembly embodying the invention is shown in one position and condition of operation.
Figure 2:
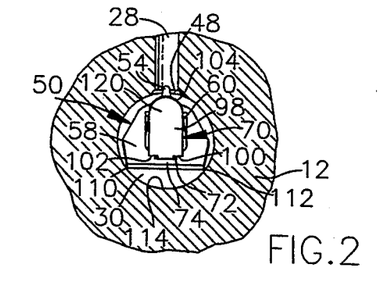
FIG. 2 is a fragmentary cross-section view taken in the direction of arrows 2—2 of FIG. 1 and illustrating the valve mechanism of FIG. 1 from an axial viewpoint.

The master cylinder assembly 10 of FIGS. 1 and 2 has a housing 12 formed to provide one or more reservoir chambers 14 and a bore 16. The master cylinder assembly 10 may be much like the dual master cylinder assembly of the above-noted U.S. Pat. No. 5,003,780. The disclosure of that patent is therefore incorporated herein by reference. Except for the valve assembly, including the particular valve mechanism, disclosed and claimed herein, FIG. 1 is similar to FIGS. 2, 4 and 5 of that last-mentioned U.S. Patent. Secondary pressurizing piston 18 is reciprocally received in bore 16, and a primary pressurizing piston (not shown) may also be received in bore 16, as shown in U.S. Pat. No. 5,003,780. A secondary pressurizing chamber 20 is defined by the bore 16, including its closed end (not shown), and the end of piston 18 seen in FIG. 1. A primary pressurizing chamber, also not shown herein (but shown in U.S. Pat. No. 5,003,780), is defined by the primary pressurizing piston and secondary piston 18 and the portion of bore 16 between the two pressurizing pistons. Another fluid reservoir chamber is associated with the primary pressurizing chamber, and has substantially the same arrangement as secondary pressurizing chamber 20 and reservoir chamber 14. Also as shown in U.S. Pat. No. 5,003,780, but not shown here in FIG. 1, a push rod is connected with the primary pressurizing piston so that movement of the push rod in one direction (toward the viewer in FIG. 1) will actuate the master cylinder 10 to pressurize fluid in the pressurizing chambers. A secondary piston return spring 22 is positioned in the secondary pressurizing chamber 20 and operatively acts on secondary pressurizing piston 18 and the primary pressurizing piston. A primary piston return spring is located in the primary pressurizing chamber and operatively engages the primary piston and the secondary piston 18 through a caging mechanism, as shown in the last-mentioned patent but not shown here. Both piston return springs are preferably preloaded in compression when the pistons are in the brake release position, with the primary piston return spring having the greater preload. Thus, when the master cylinder is in the brake release position, the caging mechanism establishes the precise distance that the pressurizing pistons are spaced apart by the primary return spring, with the secondary piston return spring 22 urging the secondary piston 18 to its released position and acting through the primary return spring to urge the primary piston to its released position.

The master cylinder assembly 10 generally described to this point is more fully described in U.S. Pat. No. 3,913,327 noted above, and is also well-known in the brake art. It is not relevant to the claimed invention other than providing a functional master cylinder in the system disclosed and partially illustrated. It is therefore sufficient to note that the primary piston can move relative to the secondary piston 18 so as to pressurize fluid in the primary pressurizing chamber and in the secondary pressurizing chamber 20 when the master cylinder is actuated. When the master cylinder is released, pressure-generated forces in the pressurizing chambers and the forces of the piston return springs move piston 18 and the primary piston toward a stop in the open end of the bore 16, all as shown in U.S. Pat. No. 5,003,780. The greater spring force of the primary piston return spring assures that the primary and secondary pressurizing pistons will be spaced axially apart, this space being determined by the caging mechanism which defines and limits the maximum axial space between these pistons. When the primary piston is operatively seated on the stop at the open end of bore 16 and the caging mechanism is at its maximum axially extended limit as illustrated in FIG. 1 of the last-mentioned U.S. Patent, the pressurizing pistons are properly located in the bore 16 in preparation for the next master cylinder actuation from the full release position.

Secondary pressurizing chamber 20 and the primary pressurizing chamber (not shown) are each arranged as follows, with only the pertinent structural elements concerning chamber 20 being shown in the drawings and now further described. Secondary pressurizing chamber 20 has a port 24 formed in the master cylinder body and located in the forward end of that pressurizing chamber.

Port 24 is operatively connected to one brake circuit and the similar port (not shown) is connected to another brake circuit. The brake circuits are not illustrated but are well known in the brake art. They contain brakes to be actuated by hydraulic pressures generated in dual master cylinder pressurizing chambers and operatively delivered to those circuits through port 24 connected to the secondary pressurizing chamber of the master cylinder and another similar port (not shown) connected to the primary pressurizing chamber of the master cylinder. Brake fluid is returned from each of the brake circuits to the pressurizing chambers through port 24 and the port (not shown) similar to it when the brakes are released by releasing the master cylinder. The release of the master cylinder permits the pressurizing chambers to expand as the pressurizing pistons are moved to their released positions. Brake fluid from each of the brake circuits is also respectively returned to the master cylinder reservoir chamber 14 (shown) and the other reservoir chamber (not shown) through compensation ports. One of the fluidic valve mechanisms to which the invention is directed controls the opening and closing of each of the compensation ports. Such valve mechanisms, including several modifications, are shown in the drawings.

Valve mechanisms, including minor variations of the valve assembly, are variously illustrated in FIGS. 2–11. Valve mechanism 26 of FIGS. 1 and 2 controls the compensation port 28 operatively connecting the master cylinder pressurizing chamber 20 with reservoir chamber 14. A similar valve mechanism controls the compensation port operatively connecting the primary pressurizing chamber with the other reservoir chamber. However, since the construction of that mechanism and its environment is the same as that of valve mechanism 26, only one valve mechanism 26 and its environment are illustrated and further described.

Port 24 extends laterally from chamber 20 and opens into a valve chamber 30 through a nozzle 32. Valve chamber 30 is formed in housing 12. Nozzle 32 is frusto-conically shaped, with port 24 extending axially through it. The frusto-conical base of the nozzle joins the annular-shaped end surface portion 34 of the valve chamber end 36 formed by the nozzle 32 and end surface portion 34. The outer side surface 38 of nozzle 32 tapers with a decreasing diameter from its base as it extends into valve chamber 30. While not shown here, the chamber end 36 may be shaped with an internal frusto-conical surface like the comparable chamber end in FIGS. 4 and 5 of U.S. Pat. No. 5,003,780 noted above, and have no nozzle. When no nozzle is used, certain corners on the planar portion of the valve member, and at times part of the positioning device, may provide valve mechanism support within the valve chamber by engaging the cylindrical wall of that chamber in a manner similar to than illustrated in FIG. 21, but without any valve mechanism support by a nozzle.

Another port 40 connects chamber 30 with the outlet 42 which is suitably connected to a brake conduit forming a part of one of the brake circuits and the brakes in that one circuit. Port 40 and outlet 42 are formed in a plug 44 which is inserted and suitably secured in place in the other end of valve chamber 30 from nozzle 32. The end 46 of plug 44 toward nozzle 32 forms the other end of the valve chamber 30. Ports 24 and 40 are in fluid flow alignment and may be considered to be inlet-outlet ports forming an inlet-outlet passage in which chamber 30 is formed and of which it is a part.

Compensation port 28 extends from reservoir chamber 14 to valve chamber 30 through a valve seat 48 formed at the point where port 28 opens into chamber 30. Valve seat 48 is formed by a beveled valve seating area. This area may be a conical or a spherical segment annular surface.

The valve mechanism 26 includes a valve member 50 which is arranged to cooperate with the valve seat 48 to open or close the valve seat, depending upon the position of the valve member in valve chamber 30. The valve member 50 has a valve body section 52 provided with a guide pin 54. The guide pin may have a rounded end or a flat frusto-conical end as variously shown in the drawings. The valve body section 52 has a spherically formed end segment 56 from which guide pin 54 extends. The guide pin 54 extends into the lower portion of compensation port 28 so as to maintain the valve member 50 in lateral position relative to valve seat 48. Thus the valve member spherical end segment 56 is always in a position to move and open or close the valve seat 48 to open or close compensation port 28.

To this descriptive extent, the valve member 50 is similar to the valve member of the above noted U.S. Pat. No. 3,913,327. However, its flow sensitive areas are differently constructed and the preferred valve member and valve mechanism illustrated includes a valve member positioning device to be described. Valve member 50 is better seen in FIGS. 6–11 in association with any of several closely related valve member positioning devices to be described later in detail.

The valve body section 52 may be either cylindrical or slightly conical in general conformation, with its base integrally formed with and axially extending from a planar section 58 at an angle somewhat less than 90°. As is better seen in the drawings of similar valve members in FIGS. 4, 4a, 12 and 16, a generally rectangular opening 60 is formed through the planar section 58 so that the planar section has an end surface 62 near the opposite end 64 of the opening 60 from the valve body section 52. The other opening end 66 extends upwardly through a part of the base of valve body section 52, with a wall portion 68 of the valve body section 52 defining the upward extending portion of opening end 66. Wall portion 68 is at an acute angle to the planar section 58, that angle being a smaller angle than the angle of the valve body section 52 to the planar section 58, as shown by a dashed line in the valve member modifications of FIGS. 4a, 13, 18 and 20.

Wall portion 68 may provide a reaction area for a portion of the valve member positioning device 70 as more fully disclosed in U.S. Pat. No. 5,003,780 noted above. That device 70 or a modification thereof is shown in its installed cooperative position with the valve member in each of FIGS. 1–3, 6–11 and 20. Valve member positioning device 70 is shown separately in FIG. 5. The valve member 50 has a slot-like opening 72 located in the end 74 of planar section 58 which is opposite its end surface 62, and is near the valve body section 52. It extends transversely across the planar section 58.

The valve member 50 is illustrated in FIG. 1 with the planar section 58 having no reinforcement buttresses. Likewise, there are no reinforcement buttresses on the planar section 58 of the valve member 50 in each of FIGS. 6–11, nor are there any reinforcement buttresses on the planar section of the valve member in each of FIGS. 12–15 and 20–21. Reinforcement buttresses 76 and 78 are provided on the planar section of the valve member in each of FIGS. 3–4a and 16–19. Clearly, one may provide such reinforcement buttresses or not as needed on any of the valve member modifications. Similarly, reinforcement buttresses may be provided extending slightly beyond either or both of the upper and lower surfaces 80 and 82 of the planar section 58 of the valve member 50. Those noted above are herein illustrated as extending beyond both such planar section upper and lower surfaces 80 and 82 when provided, except for FIG. 4a. In that Figure they extend only from the lower surface 82 of planar section 58. Reinforcement buttresses 76 and 78 are formed integrally with the sides 84 and 86 of the valve member planar section 58, and are illustrated as being formed integrally in parallel planes and extending slightly outward from the upper and lower surfaces 80 and 82 of planar section 58 of FIGS. 3 and 4, on either side of opening 60. The same is true for the valve body planar section upper and lower surfaces of the valve members of FIGS. 16–19. The space between the buttresses in each instance is effectively a continuation of the opening 60 of FIGS. 3 and 4 or its equivalent in the valve members of FIGS. 4a and 16–19.

The valve member positioning devices 70 are preferably made of a thin sheet of metal such as stainless steel. By way of example, they have been made of stainless steel materials of 0.005 inch thick to 0.020 inch thick and have functioned satisfactorily. The valve member positioning devices 70 of FIGS. 1–3 and 6–11 are quite similar. From the center portion 88 of valve member positioning device 70 the positioning device has two bends 90 and 92 made at opposite angles. The positioning device 70 has a first fluid flow impingement section 94 extending from the corner made by bend 90 to the outer end 96 of the device. It has a second fluid flow impingement section 98 extending from the second bend 92. Shoulders 100 and 102 formed on section 98 near bend 92 define a pivot line for the device on which the device is pivoted on a linear part of the upper surface 80 of valve member planar section 58. The positioning device center portion 88, the part of impingement section 98 from shoulders 100 and 102 to bend 92, and the first fluid flow impingement section 94 are slightly narrower in width than the widths of openings 60 and 72 so that they can be inserted therethrough.

First and second impingement sections 94 and 98 are shown as flat sections rather than being curvilinear in edge view as shown in the drawings of U.S. Pat. No. 5,003,780, but may be constructed in that manner if desired. This depends primarily on the flow energy characteristics in the valve chamber and the manner in which they are to be employed to move the valve mechanism under various operating conditions. Impingement section 98 terminates at end 104 of device 70.

The device 70 is assembled into the valve member 50 by inserting the first impingement section 94 through opening 72 from the upper surface 80 side of the planar section 58 on which the valve body section 52 is located, until shoulders 100 and 102 engage the upper surface 80 of planar section 134 on either side of opening 72, at the same time pivoting the device 70 so that the second impingement section 98 clears the valve body section 52. This pivoting movement is continued until the first impingement section 948 extends into the opening 60. This assembly forms the valve mechanism 26. Similar assemblies shown in the various Figures of the drawings form similar valve mechanisms described in more detail below.

Figure 6:
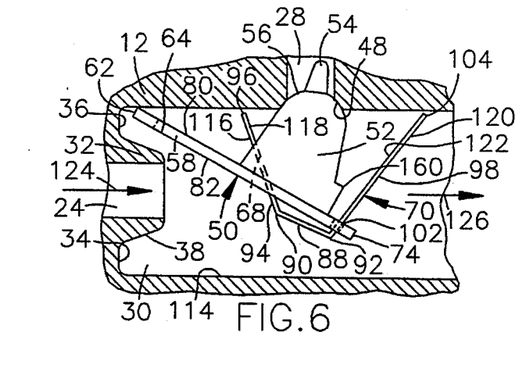
FIGS. 6 through 11 are fragmentary cross-section views of valve assemblies embodying the invention and being under various conditions.
Figure 7:
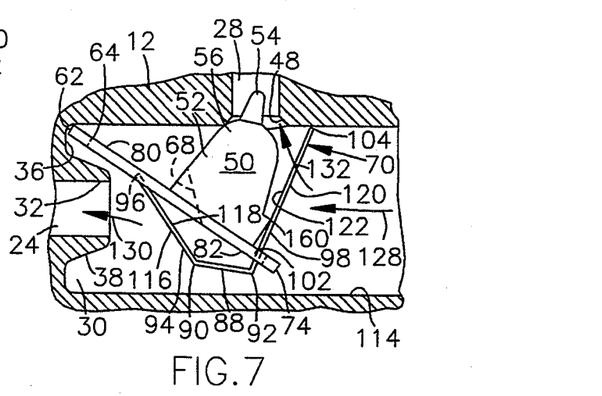
Figure 9:
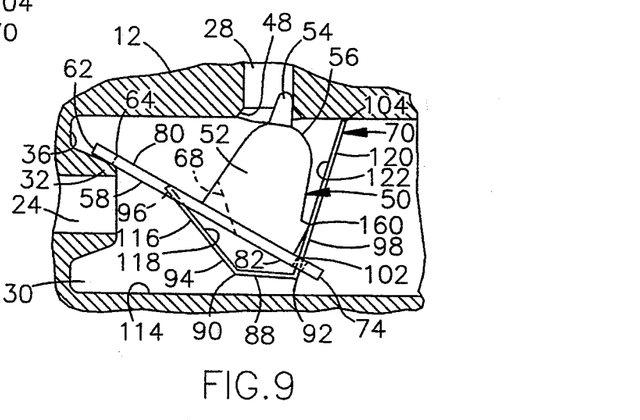
Figure 10:
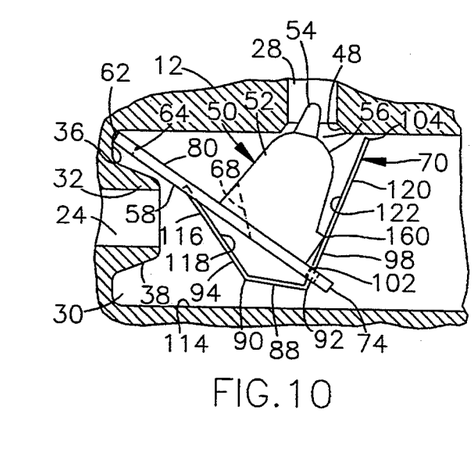
Figure 11:
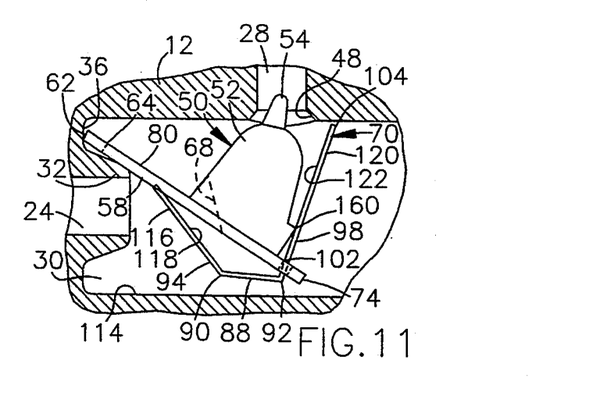
Figure 12:
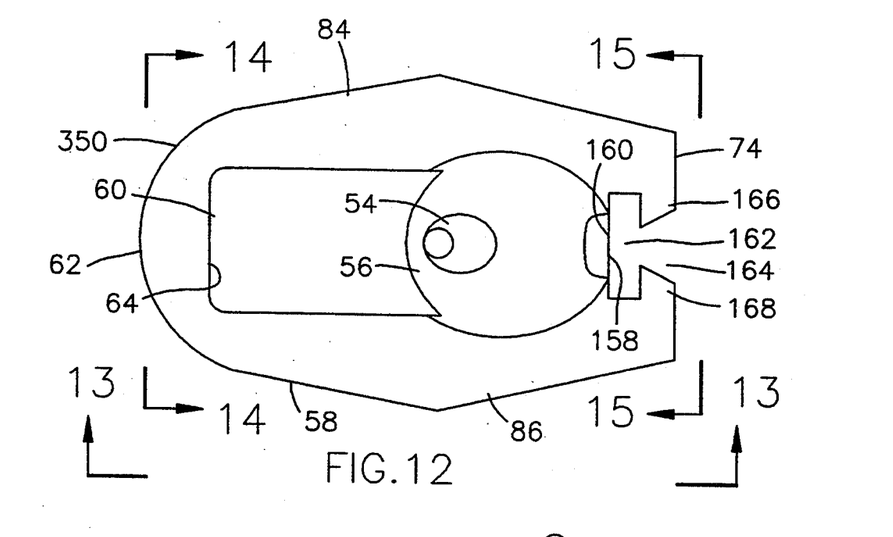
FIGS. 12 through 15 respectively show plan, side elevation, left elevation and right elevation views of a modified valve member forming a part of the invention herein disclosed and claimed.
Figure 13:
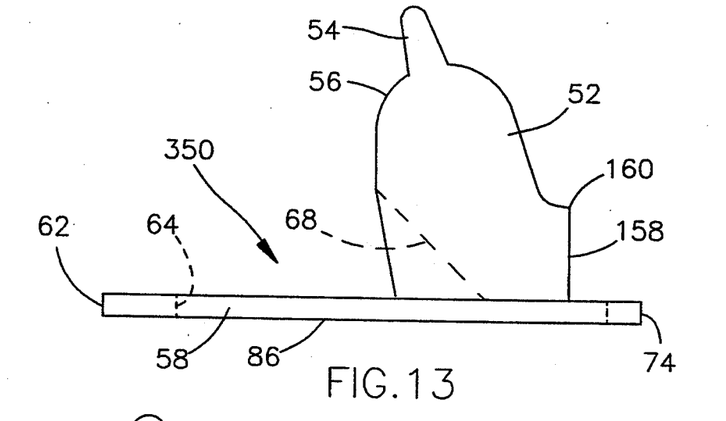
Figure 14:
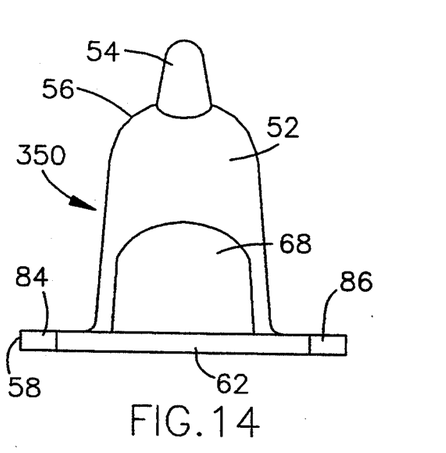
Figure 15:
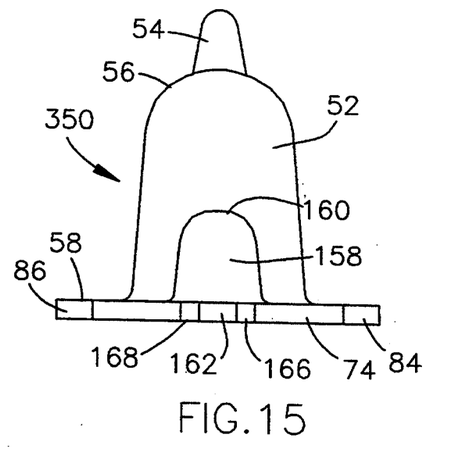

The valve mechanism is inserted in valve chamber 30 before the port plug 44 through which port 40 is formed is pressed or otherwise secured into position. The spring characteristics of the positioning device 70 permit it to bend sufficiently to be inserted as a part of the valve mechanism. When the mechanism is positioned properly, the valve member guide pin 54 will be moved into the compensation port 28 and the valve mechanism will come to its rest position shown in FIGS. 1 and 2. When plug 44 is pressed or otherwise secured into position after the valve mechanism is installed, its inner end 46 defines one end wall of the valve chamber 30. The guide pin 54 is pointing upward so that it fits within the compensation port 28 when the valve mechanism is in proper functioning position. The end 104 of the positive positioning device 70 is also pointing upward during insertion. When the valve mechanism reaches its functional position shown in FIGS. 1-3 or any of FIGS. 6-11, the planar section end near opening may be touching the beveled end portion 38 of valve chamber 30 through which port 24 opens into the valve chamber. This touching relationship provides location support for the valve mechanism 26. When the valve member end 62 is touching the valve chamber end portion 34, as shown in FIGS. 7, 10 and 11, an axial position limit for movement of the valve member 26 toward port 24 is provided when the valve mechanism is entrained in fluid flow from port 40 back into the pressurizing chamber 20 occurring upon release of the master cylinder. When the valve mechanism 26 is in the position shown in FIGS. 1-3, the corners 106 and 108 or 110 and 112 of the valve member planar section 58 also touch the cylindrical wall surface 114 defining the right cylindrical portion of valve chamber 30. The positive positioning device 70 is in the position illustrated in FIGS. 1-3. This presents the underside 116 of the first fluid flow impingement section 94 to any fluid flow from port 24 into the valve chamber 30, and the upper side 118 of impingement section 94 to any fluid flow from either port 28 or port 40, or both, to port 24.

It also presents the under side 120 of the second fluid flow impingement section 98 to fluid flow from port 40 into valve chamber 30, and the upper side 122 of impingement section 98 to fluid flow from ports 24 and 28 through valve chamber 30 toward port 40.

When the master cylinder 10 is actuated, fluid flows through port 24 into valve chamber 30. The flow energy acts on the under side 116 and the upper side 122 of device sections 94 and 98 and also the lower surface 82 of valve member planar section 58. The valve mechanism 26 is moved from the position shown in FIGS. 1-3 to the valve mechanism position shown in FIG. 6. Compensation port 28 is closed by the spherical segment end 56 of the valve member body section 52 and actuating fluid under pressure flows through valve chamber 30 from port 24 to port 40 and then through outlet 42 into the circuit connected to that outlet. Flow direction arrows 124 and 126 in FIG. 6 indicate this flow. So long as there is no flow back into the valve chamber 30 through port 40, the valve mechanism 26 will stay in the valve closed position under the influence of the brake actuating pressure in valve chamber 30 keeping the valve member spherical segment end 56 seated on valve seat 48.

Figure 3:
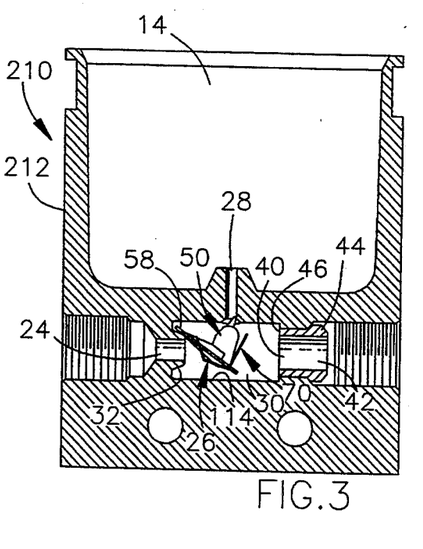
FIGS. 3 is a cross-section view similar to FIG. 1, showing a modified valve assembly embodying the invention, installed in a valve chamber formed in a part of the housing for a remote fluid reservoir. The valve mechanism of the valve assembly is shown in a modified position and condition of operation.

The valve member positioning device 70 functions as a valve lockout strut upon the beginning of return flow as the master cylinder is being released. It moves upon the least occurrence of return flow from the port 40, indicated by flow direction arrows 128 and 130 of FIG. 7, into the valve chamber 30 to open the valve and then prevent the valve from sealing. In so doing, the flow energy acts on the under side 120 and the upper side 118 of device fluid impingement sections 94 and 98 as well as on the upper surface 80 of valve member planar section 58 to move the valve mechanism. The pivotal movement of device 70 at its shoulders 100 and 102 (counterclockwise as seen in FIGS. 1, 3 and 7) moves device end 104 into engagement with the wall surface 114 of valve chamber 30 as shown in FIGS. 7 or 9, locking the valve member against closing port 28. Once the valve member spherical segment 56 is disengaged from the valve seat 48, returning fluid flows back into reservoir chamber 14 through open port 28 as indicated by fluid flow arrow 132, and continues to flow back into the master cylinder through port 24 as indicated by flow direction arrow 128. This is the valve mechanism position shown in FIG. 7.

After the release of all of the fluid pressure in the brake circuit, so that no more fluid flow is taking place in the valve chamber, the valve mechanism returns to the position shown in FIGS. 1 and 3. However, before such stasis occurs, there is a slow return flow into valve chamber 30 through port 40 from the brakes and the brake lines caused by seal and brake line recovery. This return flow, even though very slow, is sufficient to keep the device 70 so positioned as shown in FIG. 7 that the valve will not reseat. At the same time, any apply operation of the master cylinder again causing fluid flow from port 24 into the valve chamber 30 acts on the device 70, and particularly on its under surface 116, pivoting it clockwise as seen in FIG. 7, about the pivot line of shoulders 100 and 102 and moving its end 104 downwardly and away from contact with the valve chamber wall surface 114, immediately deactivating the lockout function of the device 70. This pivoting movement of device 70 at shoulders 100 and 102 results in the upper surface 118 of first fluid flow impingement section 94 engaging the valve body wall 68 as illustrated in FIG. 6, preventing further pivoting movement of device 70 relative to the valve member 50 and the fluid flow impingement forces acting on the valve mechanism move it back to the position shown in FIG. 6. The brake apply fluid flow from port 24 impinging on the under side 116 of the first fluid flow impingement section 94 of device 70 achieves this. The area of under side 116 is in the nozzle effect flow area created by port 24.

While the surfaces 116, 118, 120 and 122 of device 70 are the primary fluid flow impingement areas, the upper and lower sides 120 and 122 of valve member planar section 58 is also subjected to some fluid flow impingement which generates forces contributing to desired valve mechanism movements.

FIG. 3 illustrates a remote reservoir assembly 210. It has a housing 212. The other elements of assembly 210 are constructed much like comparable elements in the master cylinder assembly of FIG. 1 and therefore the same reference characters are used for such comparable elements. It is to be understood that any valve member or valve mechanism herein disclosed may be used in the reservoir assembly 210. The port 24 is operatively connected to an output port of a master cylinder to receive pressurized fluid therefrom and to return fluid to the master cylinder pressurizing chamber upon release. The outlet 42 is operatively connected to a circuit such as a brake circuit earlier discussed. It may be connected to a clutch actuating circuit, or another type of fluid pressure actuating circuit as desired. The housing 212 may be formed with a plurality of valve chambers 30 and reservoir chambers 14, each connected to a master cylinder pressurizing chamber and an actuating circuit as above described. Each valve chamber would have a valve mechanism in it and would respond to fluid flow in the valve chamber as described herein.

If a remote reservoir assembly with one or more fluidic valves in its housing, such as the reservoir assembly 210 shown in FIG. 3, is used, no valves are necessary in the master cylinder. The master cylinder becomes simply a tube or tubes with pistons and outlets, further simplifying its manufacture. It has no bypass holes. Also, O-ring seals may be used instead of cup seals with lips. Such a master cylinder may be used in many different applications, as disclosed in U.S. Pat. No. 5,003,780 noted above. Master cylinders currently having bypass holes and compensation ports can simply have those holes and ports sealed up, effectively converting the housing to a tube.

A hydraulic brake system with such remote reservoirs with fluidic valves can be used in tractor-trailer combinations with quick disconnect brake line fittings. It is particularly conducive to the use of silicone brake fluids, because there are at most only a few drops of fluid lost when disconnecting and reconnecting the quick disconnect fittings, and this occurs at a point intermediate the tractor and trailer so that the silicone fluid does not touch any paint which might otherwise be damaged by brake fluid. Any air included with the quick disconnect operation is quickly dispersed into the remote reservoir by the fluidic valves as above described. This in turn leads to the practicality of use of incompressible hydraulics in tractor-trailer combinations instead of compressible air with its accompanying delayed response problems. Therefore a much better anti-skid brake system response is attainable. By placing a fluidic valve-controlled remote hydraulic brake fluid reservoir at a high point in the brake line, these obstacles are overcome. Such reservoirs may also be used with hydraulic clutch master cylinders.

The more particular differences in the various modifications of valve members and positioning devices shown in drawing FIGS. 4, 4a and 6–21 will now be described. Similar parts will be assigned the same reference characters throughout except for the modifications requiring emphasis.

Figure 4:
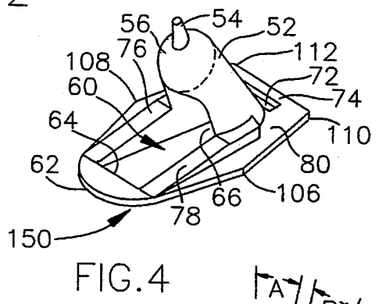
FIG. 4 is an isometric view of the valve member of a modified valve mechanism embodying the invention.

FIG. 4 shows a valve member 150 which differs from valve member 50 of FIGS. 1 and 2 primarily in that it has its buttresses 76 and 78 extending outwardly from both sides 80 and 82 of its planar section 58.

Figures 4A, 5:
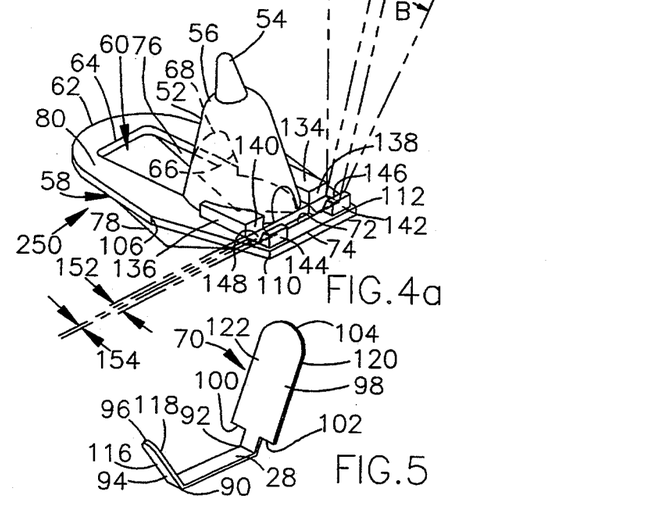
FIG. 4a is an isometric view similar to that of FIG. 4 and showing a further modified valve member of a valve mechanism embodying the invention.
FIG. 5 is an isometric view of a positive positioning device which cooperates with the valve member of FIG. 4 or 4a to form a valve mechanism embodying the invention.

FIG. 4a shows a valve member 250 which has its buttresses 76 and 78 only extending outwardly from the lower side surface 82 of its planar section 58. Also, and more importantly, it has bosses 134 and 136 on the upper surface 80 of its planar section 58 adjacent either end of opening 72 and positioned at the base of valve body section 52. These bosses 134 and 136 respectively have face surfaces 138 and 140 in a common plane running parallel to the longer sides of slot-like opening 72. The common plane of these face surfaces 138, 140 forms an acute angle with the upper surface 80 so that it is about at a 5° angle from a plane at right angles with upper surface 80 and tilted toward valve body section 52. That angle is identified as angle A in FIG. 4a. The common plane of these surfaces 138, 140 intersects the slot-like opening 72 in spaced relation to its side nearest the valve body section 52.

Valve member 250 also has bosses 142 and 144 on the upper surface 80 of its planar section 58 adjacent either end of opening 72 and positioned in opposition to bosses 134 and 136 across nearer the side of slot-like opening 72 opposite the base of valve body section 52. These bosses 142 and 144 respectively have face surfaces 146 and 148 in a common plane running parallel to the longer sides of slot-like opening 72. The common plane of these face surfaces 146, 148 forms an acute angle with the upper surface 80 so that it is about 10° from a plane at right angles with upper surface 80 and tilted away from valve body section 52. That angle is identified as angle B in FIG. 4a. The common plane of these surfaces 146, 148 intersects the slot-like opening 72 in spaced relation to the opening side further from the valve body section 52. The lines 152 and 154 of intersection of the common planes respectively containing face surfaces 138, 140 and 146, 148 with upper surface 80 of planar section 58 are parallel to each other. They are preferably spaced apart a distance equal to about one and one-half to three times, but preferably about twice, the thickness of the positioning device 70 to be used with valve member 250, while the width 156 of slot-like opening may be about three to nine times, but preferably about six times, the thickness of the positioning device 70. One dimensional relationship that has been found to be very practical is a 0.005 inch thick positioning device, a 0.030 inch wide slot 72, and a 0.010 inch space between the lines of intersection of the two common planes containing face surfaces 138, 140 and 146, 148.

By using a considerably wider slot-like opening 72 than the thickness of the positioning device, the device 70 may be easily inserted and maneuvered into position in relation to the valve member 50. Since an overly-wide slot may permit cocking of the positioning device, it is desirable to provide a very limited pivot line area for its shoulders 100 and 102. Therefore, the shoulders 100 and 102 of a positioning device 70 will respectively fit between the face surfaces 138, 146 and 140, 148. They will engage the upper surface 80 of planar section 58 between the lines 152 and 154 of intersection of the planes of the two face sets with that upper surface. The positioning device is then effectively prevented from cocking in slot-like opening 72, and is limited in its pivoting movements at shoulders 100 and 102 to the movements desired during operation of the valve mechanism. By having the face surfaces close to the pivot line, any surface tension of the brake fluid tending to resist pivotal movements of the positioning device as it moves away from a face surface exerts a minimum resistance-to-movement leverage on the positioning device because of the proximity of those surfaces to the pivot line.

It is to be understood that the arrangement of the bosses 136, 138 and 142, 144 in relation to slot-like opening 72 for obtaining the advantages of that construction may be applied to any valve member herein disclosed or any valve member disclosed in U.S. Pat. No. 5,003,780 or any functionally similar valve member.

FIGS. 6–11 show the valve mechanism 26 in various conditions of operation and positioning devices 70 made within wide but predetermined tolerance limits.

FIG. 6 shows the valve mechanism in the brake pressure applied condition of operation, with the pressure being held at some value such as 1,800 p.s.i., for example. The spherical segment 56 of the valve body section 52 is in sealing engagement with the valve seat 48, closing off compensation port 28 so that brake fluid in the valve chamber 30 is not permitted to enter the reservoir chamber 14. The positioning device is shown at a worst tolerance situation where the parts are at their maximum length. Typically the positioning device would be allowed plus or minus 0.005 inch tolerance in length and width, and plus or minus 0.5° angle at each of the bends 90 and 92. The device end 104 would be very close to the valve chamber side wall 114, but would not be locking the valve member against sealing against the valve seat. The end 62 of the planar section 58 of the valve member 50 would be touching the valve chamber side wall 114, and the positioning device impingement section 94 would have its upper surface 118 in engagement with wall 68 on the valve body section 52 at the inner end of the rectangular opening 60.

FIG. 7 shows the valve mechanism during brake release, with pressurized fluid being returned from the brake circuit through port 40 and having moved the positioning device 70 to the lockout position with its end 104 being in engagement with valve chamber wall 114 generally adjacent the valve seat 48, and the flow energy pushing against the impingement section 98 so as to keep it in the lockout position. This holds the valve spherical segment 56 away from the valve seat 48, the valve body section 52 having been moved away from seat 48 by the movement of impingement section 98 from the position shown in FIG. 6 to the position shown in FIG. 7. Flow energy has also moved the valve member 50 so that end 62 of its planar section 58 engages the annular end portion 34 of valve chamber end 38, thereby limiting its axial movement so that guide pin 54 is not permitted to come out of port 28. This FIGURE also illustrates the shortest impingement section 98 (which is acting as a lockout blade) to keep the valve in the open position.

Figure 8:
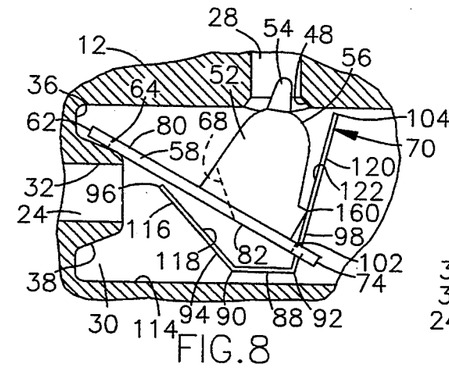

FIG. 8 shows the normal a-rest position of the valve mechanism, with no pressure in the fluid in the valve chamber 30. The corners 106 and 108 or 110 and 112 of the planar section 58 will be in engagement with the valve chamber wall 114, resting on it. See FIG. 21 for an example where corners 110 and 112 are so engaged. The portion of the planar section under surface 82 near planar section end 62 is resting on the conical outer surface 38 of the nozzle 32. If there is no nozzle, it would usually be in engagement with a conical inner surface chamber end tapering toward the entry of port 24 into the valve chamber 30. That type of valve chamber end is illustrated in the above-noted U.S. Pat. No. 5,003,780, FIGS. 4 and 5.

FIG. 9 is also at rest, and shows a possible extreme rightward position of the valve mechanism due to a worst tolerance condition of the valve member 50.

FIG. 10 is the condition found at the end of the release of brake pressure, with the valve member 50 having dropped slightly from the position shown in FIG. 7 where the brake fluid is flowing back to the reservoir and the master cylinder.

FIG. 11 shows the nominal at-rest position when all parts are at nominal values from which tolerances are permitted in plus or minus directions. It is desirable to have the valve mechanism so located that it requires the least accommodation for the valve body section spherical segment end to reseat on the seat 48, thus minimizing the amount of flow and thus the amount of brake pedal travel to seat the valve on the seat.

All of the valve body sections 52 in FIGS. 1 AND 6–11 have an exterior vertical wall portion 158 near slot-like opening 72 which is perpendicular to the planar section upper surface 80, and terminates in a pivot line corner 160. Pivot line corner 160 provides for line engagement of the impingement section 98's upper surface 122 as the positioning device 70 pivots counterclockwise about its shoulders 100 and 102, with further pivoting thereafter occurring about line corner 160. The flow energy acting on impingement section 98 during pressure release will so pivot the positioning device, forcing the valve body more toward nozzle 32 until the end 62 of the planar section 58 engages the valve chamber annular end surface 34. This gives the best position obtainable for the valve mechanism so that its impingement surfaces are best presented to port 24 when the master cylinder is again actuated and fluid flows out of port 24 into the valve chamber 30. FIGS. 12–15 show a modified valve member 350 similar to valve member 50 of FIGS. 6–11, the difference being in the treatment of the slot-like opening. Instead of a completely enclosed opening 72, this modification has a generally C-shaped opening 162, with the opening outer side having a gap 164 defined by inwardly beveled fingers 166 and 168. This arrangement makes it very easy to insert the positioning device 70 in the opening 162 by using the edgewise insertion technique, inserting one edge and then rotating the device so that the other edge also enters the opening 162. The device 70 is then retained in the opening 162 because, once in the valve chamber, it cannot rotate sufficiently to come out of the opening through the gap 164.

FIGS. 16 through 19 show the valve member 350 of FIGS. 12–15 with the addition of reinforcement buttresses 76 and 78 extending above surface 80 and below surface 82 of the planar section 58. The vertical wall portion 158 of valve body section 52 and its pivot line corner 160 of the valve member of FIGS. 12–15 have been omitted.

Figures 16, 17, 18, 19, 20, 21:
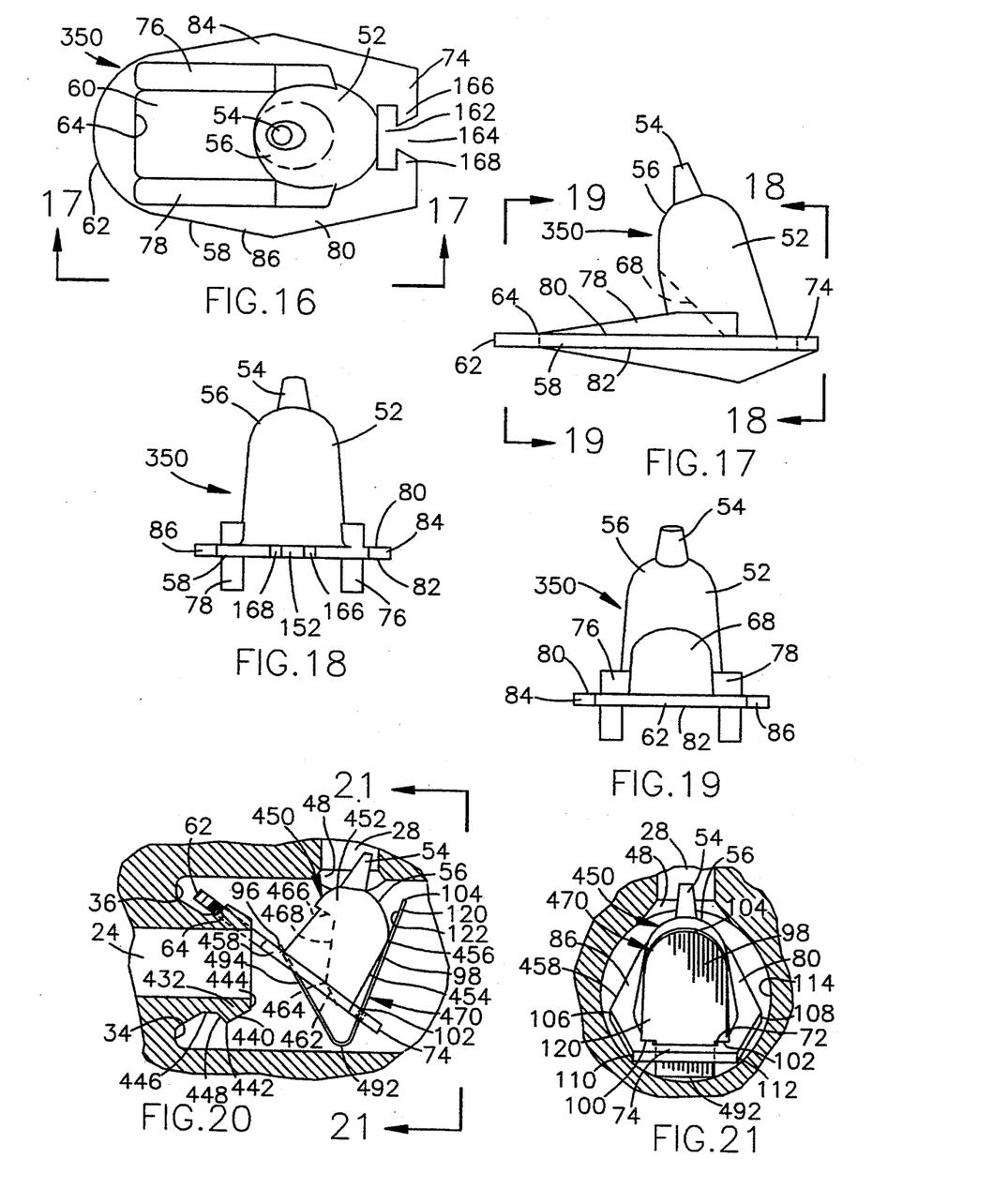
FIGS. 16 through 19 respectively show plan, side elevation, left elevation and right elevation views of another modified valve member forming a part of the invention herein disclosed and claimed. The various views shown in FIGS. 17 through 19 are respectively taken in the direction of arrows 17—17 of FIG. 16 and arrows 18—18 and 19—19 of FIG. 17.
FIG. 20 is a fragmentary cross-section view similar to FIGS. 6 through 11 showing a modified valve assembly including a modified valve mechanism and a modified valve housing. The modified valve assembly includes a modified valve member and a modified positive positioning device.
FIG. 21 is a fragmentary cross-section view taken in the direction of arrows 21—21 of FIG. 20 and illustrating the valve mechanism of that FIGURE from an axial viewpoint.

FIGS. 20 and 21 show another modified valve mechanism 426, with modifications of the valve member 450, the positioning device 470, and the nozzle 432 of the valve chamber housing. The valve member 450 is generally similar to the earlier described valve members, with modifications to the valve body section 452 and functional modifications of the planar section 458. The nozzle 432 is a modified form of nozzle 32. The positioning device 470 is a simplified modification of device 70 earlier described. Where very similar elements have no changes from the earlier valve mechanism elements which are of importance to the modification of these two Figures, the same reference characters are used for simplicity.

Valve body section 452 has a modified wall 468 forming the end of rectangular opening 460. Instead of being a flat wall, its lower end 462 which is formed in the area of planar section 458 is tapered sharply backward from corner 464 toward slot-like opening 72 in planar section 458 through which the positioning device 470 extends. Also, the upper part 466 of the wall 468 is formed to extend generally parallel to planar section 458 until the top part of opening 460 exits the valve body section 452 toward the planar section end 62. The side 454 of valve body section 452 facing slot-like opening 72 is more nearly perpendicular to the upper surface 80 of planar section 458 than the comparable side of the previously described valve member body sections. It terminates with a well-defined arcuate corner 456 where it joins the spherically formed end segment 56 of valve body section 452. This corner 456 provides a point-pivot for the second fluid flow impingement section 98 of the positioning device 470. By providing such point pivot contact, resistance to movement of the section 98 away from engagement with the valve body section due to surface tension of the fluid is minimized.

The positioning device 470 has only one bend 492, which connects the first fluid flow impingement section 494 with the second fluid flow impingement section 98. Bend 492 is at a more acute angle that was either bend 90 or 92 in the earlier described positioning device 70. As shown, bend 492 is at an angle of about 50°. Impingement section 98 is provided with shoulders 100 and 102 as before, and these shoulders form a pivot line on the upper surface 80 of planar section 458 outboard of the ends of slot-like opening 72 as before. Thus, device 470 is pivotally movable at shoulders 100 and 102 clockwise from the position shown in FIG. 20, disengaging impingement section 98 from corner point 456 and being so movable until impingement section 494 engages the corner 464 formed by the intersection of the main part of wall 468 with the lower end 462 of that wall. Again, by having a line contact with the impingement section 494 instead of a surface area contact, resistance to disengaging movement due to surface tension between the two touching parts is minimized.

The nozzle 432 has a differently formed outer surface 438. The conically tapered portion 440 is at its maximum diameter at an annular ridge 442 formed intermediate the nozzle end surface 444 and the annular shaped portion 34 of valve chamber end 36. A groove 446 is thus defined between ridge 442 and annular shaped portion 34. The wall 448 of the groove 446 formed by the other side of ridge 442 from surface portion 440 is, as seen in cross section in FIG. 20, at an angle of about 45° to the wall 114 of the valve chamber 30, which is parallel to the axis of port 24 and the valve chamber.

When the valve mechanism 426 is installed, the end 62 of planar section 458 is hooked over ridge 442, with the ridge extending into the end 64 of rectangular opening 460. The end 64 rests on a part of wall 448 and pivots on that wall as the valve mechanism 426 is moved to open and close valve seat 48. This provides a definite limit to axial movement of the valve member 450 rightwardly as seen in FIG. 20 under any operating condition. Also, the limit of leftward axial movement of the valve member 450 is set by the point of engagement of planar section end 62 with the part of the valve chamber end 36 formed by annular portion 34. That engagement may be in the corner where annular portion 34 joins the valve chamber wall 114 when the valve is in the open position, or may be at any point on annular portion 34 between that corner and the base of the nozzle 432 with the valve movements that occur during operation. With the hooked arrangement of the planar section end on the ridge 442 and the action of the guide pin 54 in port 28, the valve mechanism 426 is maintained in position to be able to open or close at all times. When the valve mechanism 426 is in the at-rest position shown in FIGS. 20 and 21, with no pressure in chamber 30, the corners 110 and 112 of the planar section 458 rest on the chamber wall 114. Also, the edges of the positioning device bend 492 rest on that wall. Support is therefore provided to the valve mechanism 426 near both ends of the planar section 458 and at the bend 492 of the positioning device 470. This support is locational in that it keeps the open valve mechanism 426 in position to be acted on by any fluid flow from port 24 into valve chamber 30, immediately closing spherical segment 56 against valve seat 48 and sealing compensation port 28.

I claim:

1. A fluid flow sensitive valve assembly comprising:
   a housing having a valve mechanism received in a valve chamber formed in said housing;
   said valve chamber having a cylindrical side wall and axially spaced first and second end walls and first and second ports respectively opening through said first and second end walls and a third port opening through a valve seat formed in said cylindrical side wall at a point axially intermediate said end walls, said axially spaced first end wall including an annular section through which said first port is axially formed, said annular section being frusto-conically formed to define a frusto-conical surface thereof, said annular section frusto-conical surface extending axially toward said second end wall of said valve chamber;
   said valve mechanism including a valve member located partially within said valve seat and movable relative thereto into seated and unseated positions to respectively close and open said third port, said valve member having a substantially planar body section defined by upper and lower sides and first and second ends, said valve member also having a main valve body section extending outwardly from said planar body section upper side intermediate said first and second ends of said planar body section, said main valve body section including a surface portion selectively engageable in seated relation with said valve seat and disengageable from said valve seat in unseated relation therewith and a portion extending into said third port about which fluid may flow into and out of said third port when said valve seat is not closed by said valve member main valve body section surface portion;

valve member positioning means mounted on said valve member and movable with said valve member as said valve member moves between its seated and unseated positions relative to said valve seat;

said valve member positioning means having a maximum width less than the diameter of said valve chamber between said end walls and having one end thereof positioned near said second port and including a valve mechanism position location point thereon engageable with said valve chamber side wall intermediate said second and third ports;

said valve member having only first and second position location points, said first position location points being only on said planar body section first end, said second valve position location points being a pair of such points laterally opposite each other and formed on a defined portion of said planar body section defined as that part of said planar body section from and including said planar body section second end to that intermediate part of said planar body section intersected by a lateral plane extending at a right angle from said planar body section and touching the part of said main valve body section furthermost from said planar body section second end, said first valve position location points being engageable with at least one part of said first valve chamber end wall including said annular section frusto-conical surface and said second valve position location points being engageable with said valve chamber side wall intermediate said valve chamber end walls for locating said valve mechanism in said valve chamber so that said valve member is unseated from said valve seat when there is no fluid flow through said valve chamber and also when there is fluid flow from said second port to said first port through said valve chamber, and said valve member is seated on said valve seat to close said valve seat and said third port when there is fluid flow from said first port to said second port through said valve chamber;

and fluid flow-impinging surfaces on said valve mechanism acting when fluid flow impinges thereon from said first port to said second port to move said valve mechanism from the valve member unseated position to the valve member seated position relative to said valve seat and acting when fluid flow impinges thereon as fluid flows toward said first port in said valve chamber from at least one of said second and third ports to move said valve mechanism from the valve member seated position to the valve member unseated position relative to said valve seat.

2. The fluid flow sensitive valve assembly of claim 1, said axially spaced first end wall including an annular section through which said first port is axially formed, said annular section being frusto-conically formed to define a frusto-conical inner surface thereof, said annular section frusto-conical inner surface extending axially toward said second end wall of said valve chamber from said first port.

3. The fluid flow sensitive valve assembly of claim 2, said planar body section having an edge surface between and joining said planar body section upper and lower sides and including the corners at such joining, said first position location points being only on the part of said edge surface of said planer body section one end and being operationally engageable only with said first end wall annular section frusto-conical inner surface.

4. The fluid flow sensitive valve assembly of claim 2, said planar body section having an edge surface between and joining said planar body section upper and lower sides and including the corners at such joining, said first position location points being only on the part of said edge surface of said planer body section one end and said second position location points being only on the part of said edge surface on said defined portion of said planar body section, said first position location points operationally engaging only said first end wall annular section frusto-conical inner surface.

5. The valve mechanism of claim 2 in which said valve member positioning means has a first fluid flow-impingeable surface acted on by fluid flow from said first port into said valve chamber to initiate movement of said valve mechanism toward valve member seating on said valve seat, such valve mechanism movement causing said valve member positioning means one end to move said one end location point into engagement with said valve chamber cylindrical side wall, said valve member planer body section lower side being a second fluid flow-impingeable surface subject to fluid flow from said first port into said valve chamber, the fluid flow from said first port into said valve chamber then continuing to act on said first and second fluid flow-impingeable surfaces to cause pivotal movement of said valve mechanism about said valve member positioning means one end to seat said valve member on said valve seat and close said third port.

6. The valve mechanism of claim 5 in which said valve member positioning means has a third fluid flow-impingeable surface which when acted on by fluid flow from said second port into said valve chamber initiates pivotal movement of said valve mechanism about said valve member positioning means one end to unseat said valve member from said valve seat.

7. The valve mechanism of claim 6 in which said valve member positioning means has a fourth fluid flow-impingeable surface which is also acted on by fluid flow from said second port into said valve chamber to hold said positioning means one end location point into continued pivot point contact with said valve chamber cylindrical side wall and prevent closing of said valve seat by said valve member so long as there is fluid flow from said second port into said valve chamber.

8. The fluid flow sensitive valve assembly of claim 1, said planar body section having an edge surface between and joining said planar body section upper and lower sides and including the corners at such joining, said first position location points being only on the part of said edge surface of said planer body section one end and said second position location points being only on the part of said edge surface on said defined portion of said planar body section.

9. The fluid flow sensitive valve assembly of claim 1, said planar body section having an edge surface between and joining said planar body section upper and lower sides and including the corners at such joining, said first position location points being on the part of said edge surface of said planar body section one end and also on the part of said planar body section lower side of said planar body section one end adjacent said edge surface of said planar body section one end, said second position location points being only on the part of said edge surface on said defined portion of said planar body section.

10. The fluid flow sensitive valve assembly of claim 9 said first axially spaced end wall including an annular wall section, an annular center section surrounded by said annular wall section through which said first port is axially formed, said annular center section being frusto-conically formed to define a frusto-conical outer surface thereof, said annular center section extending axially into said valve chamber from said annular wall section, said first position location points on the part of said planar body section lower side being operationally engageable with said frusto-conical outer surface, and said first position location points on the part of said edge surface of said planar body section one end being operationally engageable with said annular wall section of said first end wall.

11. The fluid flow sensitive valve assembly of claim 1, said first axially spaced end wall including an annular wall section, an annular center section surrounded by said annular wall section through which said first port is axially formed, said annular center section being frusto-conically formed to define a frusto-conical outer surface thereof, said annular center section extending axially into said valve chamber from said annular wall section.

12. The valve mechanism of claim 11 in which said annular center section frusto-conical outer surface has an annular lip at an axially intermediate portion thereof separating said frusto-conical outer surface into two frusto-conical outer surface sections joined by a reverse frusto-conical outer surface section forming said annular lip, said planar section first opening being hooked over an arcuate portion of said lip so that said planar section first end is positioned between said reverse frusto-conical outer surface section and said annular wall section, said planar first end being pivotally engageable with said reverse frusto-conical outer surface section to limit axial movement of said valve mechanism toward said second port and assisting said guide pin in keeping said valve body aligned with said valve seat in seating and unseating relation.

13. The valve assembly of claim 1 in which said valve member positioning means one end valve mechanism position location point initially engages said valve chamber cylindrical side wall as said valve mechanism is moved from the unseated valve member position toward the seated valve member position to establish a pivot point about which said valve member is then moved into its seated position with said valve seat, said pivot point also having said valve mechanism pivotally moved thereabout to unseat said valve member from said valve seat with said positioning means one end continuing to engage said valve chamber cylindrical side wall so long as there is fluid flow from said second port into said valve chamber.

14. The fluid flow sensitive valve assembly of claim 1, said planar body section having an edge surface between and joining said planar body section upper and lower sides and including the corners at such joining, said first position location points being on the part of said edge surface of said planar body section one end and also on the part of said planar body section lower side of said planar body section one end adjacent said edge surface of said planar body section one end, said second position location points being only on the part of said edge surface on said defined portion of said planar body section.

15. A fluid flow sensitive valve mechanism adapted to be operationally positioned, in a valve chamber having first and second end walls and a side wall and first and second inlet-outlet ports respectively opening into the valve chamber through the first and second end walls and a third inlet-outlet port opening into the valve chamber through the side wall through a valve seat, between the valve chamber first and second inlet-outlet ports, said valve mechanism comprising:

a valve member adapted to control the opening and closing of the valve chamber third inlet-outlet port by being movable from a third port-opened position where it is disengaged from the valve seat to a third port-closed position where it is engaged with the valve seat in response to flow of fluid into the valve chamber from the first port which will impinge on first surface means of said valve mechanism and being movable from the third port-closed position to the third port-opened position in response to flow of fluid into the valve chamber toward the first port which will impinge on second surface means of said valve mechanism;

said valve member having a substantially planar body section defined by upper and lower sides and an outer edge surface joining said upper and lower sides, said planar body section having first and second ends;

said valve member also having a valve body section extending outwardly from said planar body section upper side intermediate said first and second ends of said planar body section, said valve body section including a surface portion selectively engageable in seated relation with the valve seat and disengageable from the valve seat in unseated relation therewith and another portion extending into said third port about which fluid may flow into and out of the third port when the valve seat is not closed by said valve member main valve body section surface portion;

said valve member having contact points adapted to selectively engage the valve chamber side wall while the valve member is in operational position in relation to the valve chamber and the valve chamber inlet-outlet ports, said contact points being only at the juncture of said valve member substantially planar body section outer edge surface with at least one of said valve member substantially planar body section upper and lower sides;

said valve member substantially planar body section first end having other contact points adapted to engage the valve member second end wall through which the second inlet-outlet port opens, said other contact points being only at the juncture of said valve member substantially planar body section outer edge surface with at least one of said valve member substantially planar body section upper and lower sides and on a part of said valve member substantially planar body section lower side which is immediately adjacent the part of said outer edge surface forming the extreme edge of said first end;

said contact points and said other contact points being the only points on said valve member contacting the end walls or side wall of the valve chamber while said valve member is operationally positioned in the valve chamber other than any contact point on said valve member valve body section;

said valve mechanism further having valve mechanism positioning means on said valve member, said valve mechanism positioning means being adapted to be engageable only with the valve chamber side wall while fluid flow is passing through the valve chamber to position said valve member relative to the third port and to position said first and second surface means of said valve mechanism for fluid flow impingement thereon.

16. The valve mechanism of claim 15 in which said valve mechanism positioning means is adapted to be engageable with a side wall of the valve chamber adjacent the third inlet-outlet port while the flow of fluid is impinging on said second surface means of said valve mechanism and when so engaged preventing the closing of the third inlet-outlet port by said valve member while there is any fluid flow in the valve chamber toward the first inlet-outlet port.

17. The valve mechanism of claim 15 in which said first and second surface means are each at least in part on said valve mechanism positioning means.

18. The valve mechanism of claim 17 in which said first and second surface means are each also in part on said valve member.

19. The valve mechanism of claim 17 in which said valve member positioning means is pivotally mounted on said valve member and is capable of transmitting forces to said valve member moving said valve member in response to fluid flow impingement forces on said first and second surface means of said valve member positioning means.

20. The valve mechanism of claim 19 in which said valve member planar body section has a slot-like opening formed laterally therethrough adjacent said second end thereof and also adjacent said valve body section so that the longer width of said slot-like opening extends transversely of said planar body section; said valve member positioning means having one part thereof of narrower width than the longer, transversely extending, width of said slot-like opening and another part thereof joining said one part and being wider than the longer transverse width of said slot-like opening and having shoulders at its juncture with said one part, said one part extending through said slot-like opening with said shoulders pivotally engaging said planar body section upper side to define aligned pivotal line segments transversely beyond either transversely spaced end of said slot-like opening and substantially in alignment with the transverse center line of said slot-like opening; said planar section upper side having a first pair of bosses positioned on one side of each of said pivotal line segments and a second pair of bosses positioned on the other side of each of said pivotal line segments, said first and second pairs of bosses each having face surfaces located in a common plane extending to said planar section upper surface in spaced relation to said pivotal line segments, said common plane having said face surfaces of said first pair of bosses being at about an 85° angle from said planar section upper surface and tilted toward said valve body section, said common plane having said face surfaces of said second pair of bosses being at about an 80° angle from said planar section upper surface and tilted away from said valve body section; the narrower width of said slot-like opening being on the order of three to nine times the thickness of said positioning means extending therethrough, and the width between where said two common planes containing said boss face surfaces intersect said planar section upper surface being about 1.5 to three times the thickness of said positioning means at said shoulders and being substantially centered in alignment with the transverse center line of said slot-like opening; said positioning means being able to pivot on the pivot line segments at said shoulders on the upper surface of said planar section through about 15° and being engageable with one pair of said boss face surfaces at the maximum allowable pivot angle position permitted by said face surfaces in either pivotal direction.

21. A fluid flow sensitive valve assembly comprising:

a housing having a valve chamber formed therein and first and second and third inlet-outlet ports communicating with said chamber, said first and second ports being generally axially aligned and at opposite ends of said chamber, said third port having a valve seat at said chamber, said chamber having a circular cross-section and an axially extending side wall surface through which said third port opens, said chamber also having first and second end walls through which said first and second ports open, said first end wall having an annular conically beveled surface portion formed about said first port;

a movable valve mechanism in said valve chamber, said valve mechanism having a valve member and a valve mechanism positive positioning device;

said valve member comprising a longitudinally extending valve member planar section having upper and lower sides and first and second ends with valve chamber wall-engaging points on said first end and laterally spaced apart on a defined portion of said planar body section defined as that part of said planar body section from and including said planar body section second end to that intermediate part of said planar body section intersected by a lateral plane extending at a right angle from said planar body section and touching the part of said valve body furthermost from said planar body section second end, and a valve body engageable with said valve seat in opening and closing relation and a guide pin on said valve body extending through said valve seat and into said third port, said valve body extending from said upper side of said planar section intermediate said planar section first and second ends, said planar section also having a first opening formed through said planar section and extending through a part of said valve body and defining with said valve body a valve body inner wall, and a second opening formed through said planar section and extending transversely of said planar section between said valve body and said second planar section end, said valve body having a pivot edge formed thereon adjacent said second opening;

said valve mechanism positive positioning device comprising a sheet member which is generally J-shaped in cross section, said device having a first section and a second section operatively connected with said first section by a transverse bend;

said device further having a transverse pivot line formed on said second section adjacent to but spaced from said transverse bend, said first section being a first fluid flow impingement section and having an upper side and a lower side and also being of a lateral width less than the lateral width of the narrower of said first and second openings, said upper side and said lower side of said first section being respectively angularly disposed relative to said first and third ports, said second section being a second fluid flow impingement section and having an upper side and a lower side with said lower side facing away from said first section and toward said third port, said second section having its major length being of greater width than either of said first and second openings and defining shoulders adjacent to but spaced from said transverse bend, said second section transverse pivot line being on said upper surface adjacent to but spaced from said shoulders in a direction away from said transverse bend, said second section further having a rounded outer end of lesser diameter than the diameter of said valve chamber circular cross-section;

said device second section extending first through said second opening so that said shoulders of said second section rest on the upper side of said planar section on either side of said second opening, said second section then extending under said valve body to said transverse bend and said first section being extendable into said first opening, said pivot line on said second section being engageable with said valve body pivot edge and said device first section is pivotally movable about said pivot line;

whereby fluid flowing into said chamber from said first port impinges on said device first section lower side, engaging said device second section shoulders with said planar body section upper side, said fluid also impinging on the lower side of said valve member planar section, the impingement of said fluid flow acting on said valve mechanism to move said valve body into engagement with said valve seat and close said third port, said positioning device second section rounded outer end engaging said chamber wall in point contact, the fluid flowing from said first port flowing out through said second port; and fluid flowing into said chamber from said second port impinges on said device second section lower side tending to hold said second section outer end into engagement with said chamber wall and flows around and under said second section and impinges on said first impingement section upper side, causing said positioning device to pivot at said pivot line on said valve member and then cause said valve member and said positioning device to be moved pivotally about said second section outer end to move said valve body away from said valve seat and allow fluid in said valve chamber to flow back to said reservoir through said third port; said valve mechanism moving upon cessation of fluid flow in said valve chamber to return to its rest position with said planar body section first end engaging said conically beveled surface of said chamber first end wall at one of said planar section first end wall-engaging points and said planar section laterally spaced wall-engaging points engaging said chamber side wall said wall-engaged wall-engaging points supporting said valve mechanism with said valve body open relative to said valve seat.

22. The fluid flow sensitive valve assembly of claim 21, said valve mechanism positive positioning device further having a third section connected with said second section by said transverse bend and connected with said first section by a second transverse bend so that said first and third sections are operatively connected by said first-named transverse bend; said third section extending under said valve body from said first-named transverse bend to said second transverse bend.

23. The fluid flow sensitive valve assembly of claim 21, said planar section also having a pair of strengthening buttresses extending from at least one side of said planar section and being intermediate and spaced from said planar section ends, said first opening formed through said planar section being located laterally between said buttresses.

* * * * *